No. 811,754. PATENTED FEB. 6, 1906.
A. L. WEST.
STRAINER.
APPLICATION FILED FEB. 6, 1905.

2 SHEETS—SHEET 1.

Witnesses
A. G. Hague.
J. B. Whitney.

Inventor, A. L. West.
By Orwig & Lane
Att'ys

No. 811,754. PATENTED FEB. 6, 1906.
A. L. WEST.
STRAINER.
APPLICATION FILED FEB. 6, 1905.

2 SHEETS—SHEET 2.

Witnesses
A. G. Hague
J. B. Smutney

Inventor, A. L. West.
by Quigg & Lane attys

UNITED STATES PATENT OFFICE.

ALEXANDER L. WEST, OF GOWRIE, IOWA.

STRAINER.

No. 811,754.

Specification of Letters Patent.

Patented Feb. 6, 1906.

Application filed February 6, 1905. Serial No. 244,403.

*To all whom it may concern:*

Be it known that I, ALEXANDER L. WEST, a citizen of the United States, residing at Gowrie, in the county of Webster and State of Iowa, have invented certain new and useful Improvements in Strainers, of which the following is a specification.

The objects of my invention are to provide a strainer of simple, durable, and inexpensive construction which is so constructed that the substance to be strained does not have to be poured upon the straining portion of the device, and thus eliminate to a great extent the washing of the substances which need to be strained out through the straining portion of the device.

A further object is to provide a strainer which can be easily and readily cleaned and kept in this condition and which will effectively strain the substance to be strained.

My invention consists in certain details in the construction, arrangement, and combination of the various parts of the device whereby the objects contemplated are attained, as hereinafter more fully set forth, pointed out in my claims, and illustrated in the accompanying drawings, in which—

Figure 1:
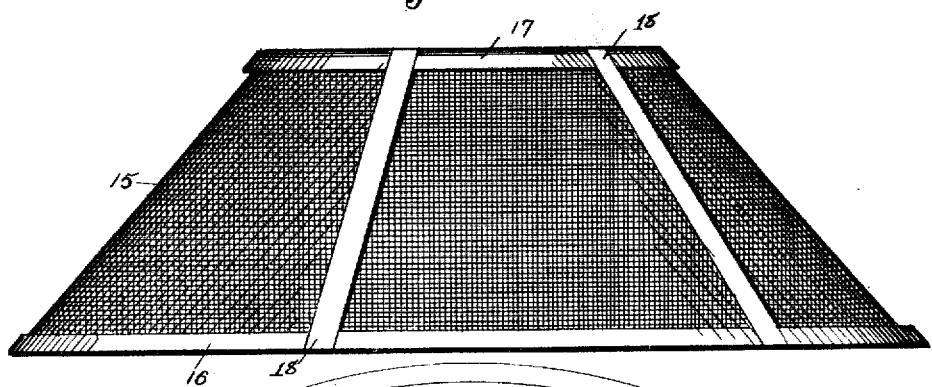
Figure 2:
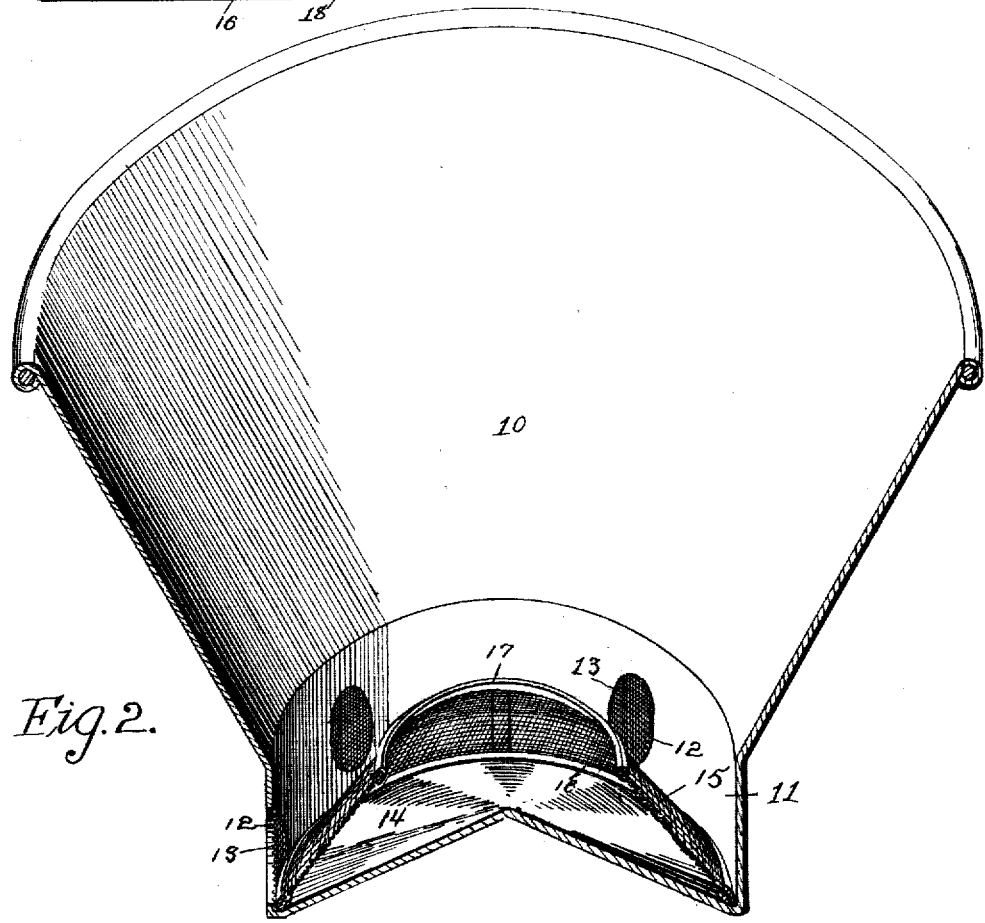
Figure 3:
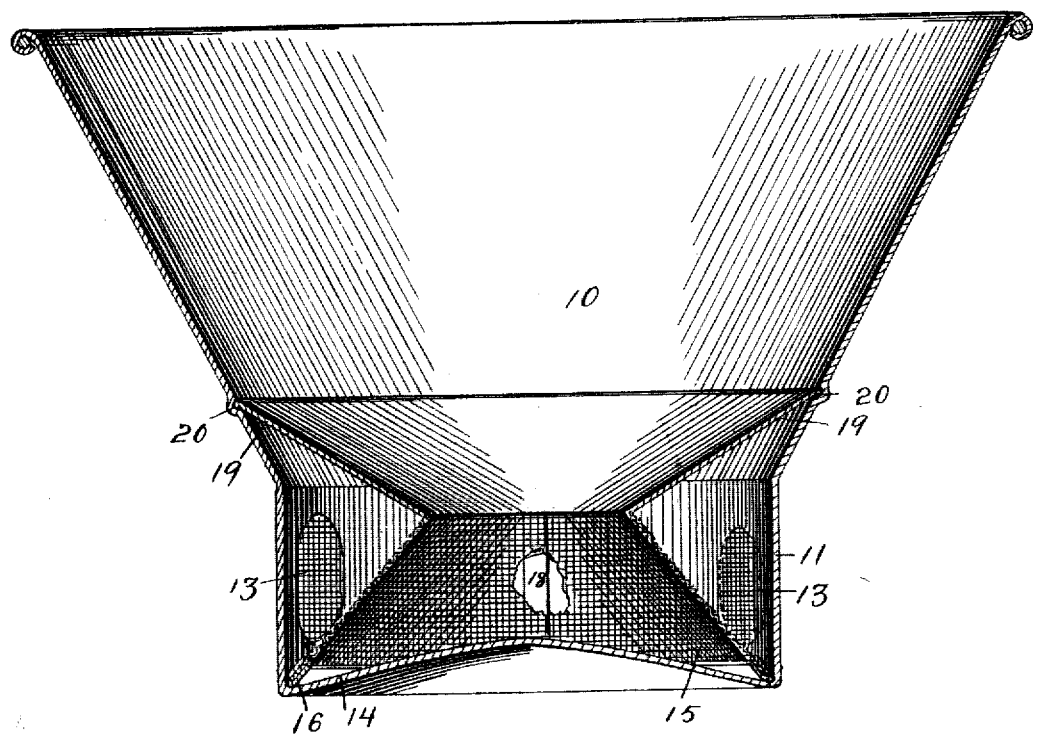

Figure 1 is a side elevation of the screen which is to be placed on the bottom of the strainer. Fig. 2 is a detail sectional view of the complete strainer, showing the screen in position at the bottom of it; and Fig. 3 is a detail sectional view of the funnel, showing a funnel attached to the top of the inverted-funnel-shaped screen.

Referring to the accompanying drawings, I have used the reference-numeral 10 to indicate the funnel of the strainer, which has the circular portion 11 at its lower end. This circular portion has a series of openings 12, in which there are woven-wire screens 13. There is an oval bottom 14, forming the lower part of the circular portion 11 and the bottom of the strainer. I have provided a funnel-shaped screen 15, having its larger opening at its lower end. This screen 15 has a metal band 16 at its lower portion and a metal band 17 at its upper portion, said bands being connected by a series of bands 18 to hold these bands in position relative to each other and also to support a woven wire between them. The upper band 17 forms a circle of considerably less diameter than the band 16, so that as the band 17, which forms the lower portion of the screen, rests on the bottom 14, as shown in Fig. 2, the upper portion will be some distance inside the circular portion 11.

In the preferable form of the device a funnel 19 is provided, which is attached to the upper end of the screen 15 and having its upper portion entering a slight circular depression 20 in the funnel 10, thus preventing any milk from getting outside of the screen 15, except that which is poured through it.

In practical use and assuming that the screen 15 is resting on the bottom 14 and milk or other substance is poured into the circular opening formed by the band 17 the milk or other substance will strike the top of the oval bottom 14 and is forced upwardly through the wire of the screen 15 and will then flow out through the wires 13 in the openings 12 and a perfect straining of the milk or other substance can be had, owing to the fact that it first strikes the bottom and the force of the flow is eliminated to a large extent, and as the milk rises from the bottom 14 it will pass through the screen 15 and out through the woven wire 13 in the openings 12, and the milk will be thoroughly strained.

When it is desired to clean the strainer, this is done by simply removing the screen and funnel 19 attached to it and washing them separately from the rest of the strainer.

Having thus described my invention, what I claim, and desire to secure by Letters Patent of the United States therefor, is—

1. In a device of the class described, a funnel-shaped portion having a number of openings in the lower portion of its sides, a screen in each of these openings, and an oval bottom for the funnel, and a funnel-shaped screen inverted and placed upon the bottom, for the purposes stated.

2. In a device of the class described, a funnel-shaped portion having a number of openings in the lower portion of its sides, a screen in each of these openings, an oval bottom for the funnel, an inverted-funnel-shaped screen having a funnel attached to its upper end designed to engage the first-mentioned funnel when the inverted-funnel-shaped screen is placed upon the bottom.

3. In a device of the class described, a funnel-shaped portion having a number of openings in the lower portion of its sides, a screen in each of these openings, an oval bottom for the funnel, an inverted-funnel-shaped screen having a funnel attached to its upper end designed to engage the first-mentioned funnel when the inverted-funnel-shaped screen is placed upon the bottom, a circular band at the lower end of the funnel-shaped screen, and means for securing the funnel-shaped screen between the band and the lower portion of the funnel attached to the screen rigidly in position relative to each other.

4. In a strainer, a funnel-shaped portion, a circular portion at the bottom of the funnel-shaped portion having a number of openings in it, a woven-wire screen in each of these openings, a bottom connected with the lower end of the circular portion, a funnel-shaped screen inverted and placed upon the bottom, comprising two circular bands, and means for securing these bands in position relative to each other.

5. In a strainer, a funnel-shaped portion, a circular portion, at the bottom of the funnel-shaped portion having a number of openings in it, a woven-wire screen in each of these openings, a bottom connected with the lower end of the circular portion, a funnel-shaped screen inverted and placed upon the bottom, comprising two circular bands, bands connecting the upper and lower circular bands, and a wire between said upper and lower bands.

ALEXANDER L. WEST.

Witnesses:
G. B. JOHNSON,
C. D. LORSON.